(12) United States Patent
Jain et al.

(10) Patent No.: US 8,964,546 B1
(45) Date of Patent: Feb. 24, 2015

(54) INDIRECT MEASUREMENT OF USER TRAFFIC ON LINKS

(71) Applicant: Google Inc., Mountain View, CA (US)

(72) Inventors: Sushant Jain, Sunnyvale, CA (US); Alok Kumar, Fremont, CA (US); Rui Zhang-Shen, Forest Hills, NY (US); Michael Alex Frumkin, Santa Clara, CA (US); Aspi Homi Siganporia, Saratoga, CA (US); Matthew Jonathan Holliman, Union City, CA (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/755,277

(22) Filed: Jan. 31, 2013

Related U.S. Application Data (60) Provisional application No. 61/592,771, filed on Jan. 31, 2012.

(51) Int. Cl.
*H04L 12/28* (2006.01)
*H04L 12/825* (2013.01)
*H04L 12/26* (2006.01)

(52) U.S. Cl.
CPC ............ *H04L 47/25* (2013.01); *H04L 43/0894* (2013.01)
USPC .......................................................... 370/232

(58) Field of Classification Search
None
See application file for complete search history.

(56) References Cited

U.S. PATENT DOCUMENTS

| | | | |
|---|---|---|---|
| 8,108,495 B1 * | 1/2012 | Zuk et al. ...................... | 709/220 |
| 2001/0019554 A1 * | 9/2001 | Nomura et al. ............... | 370/389 |
| 2006/0252429 A1 * | 11/2006 | Chen et al. .................... | 455/450 |
| 2013/0114409 A1 * | 5/2013 | Iovanna et al. ................ | 370/235 |

* cited by examiner

*Primary Examiner* — John Blanton
(74) *Attorney, Agent, or Firm* — Foley & Lardner LLP; Edward A. Gordon (57) ABSTRACT

Systems and methods are disclosed herein for measuring the traffic flow on a link. The system includes a processor that is configured to generate aggregate egress data for multiple origin endpoints by aggregating amounts of egress traffic detected by servers processing the egress traffic at the origin endpoints. The processor is also configured to obtain the proportions of traffic flows that traverse each path between each endpoint pair, which includes an origin endpoint and a destination endpoint. Each path includes multiple network links such that a single network link may be shared across multiple paths. Finally, the processor computes an amount of traffic flow on a shared link based on the aggregate egress data and the obtained proportions.

18 Claims, 5 Drawing Sheets

INDIRECT MEASUREMENT OF USER TRAFFIC ON LINKS

CROSS REFERENCE TO RELATED APPLICATION

This application claims benefit under 35 U.S.C. §119(e) of U.S. Provisional Application No. 61/592,771, filed on Jan. 31, 2012, which is incorporated herein by reference in its entirety.

FIELD OF THE INVENTION

In general, the invention relates to systems and methods for measuring the amount of traffic flow on a link.

BACKGROUND OF THE INVENTION

In a network, packets of data flow along paths in the form of traffic between endpoints. Routers located along the paths direct the data packets to other routers, until the data packets reach their destinations. Network links carry data packets directly between two routers, and each link is associated with a maximum flow capacity, or a maximum amount of data that the link can transfer within a unit of time. When traffic on a link is congested, meaning traffic is near or exceeds the flow capacity of the link, delays and possible loss of data packets occur. Thus, it is desirable to have a mechanism that provides reliable data indicating the amount of traffic on a link which can be used to adjust the traffic flows as necessary.

SUMMARY

Accordingly, systems and methods disclosed herein provide a method for measuring the amount of traffic flow on a link. According to one aspect, the invention relates to a system that measures the amount of traffic flow on a link. The system includes a processor that is configured to generate aggregate egress data for multiple endpoints by aggregating amounts of egress traffic detected by servers processing the egress traffic at the endpoints. The processor is also configured to obtain the proportions of traffic flows that traverse each path between each pair of endpoints. Each path includes multiple network links such that a single network link may be shared across multiple paths. Finally, the processor computes an amount of traffic flow on a shared link based on the aggregate egress data and the obtained proportions.

According to another aspect, the invention relates to a method for measuring the amount of traffic flow on a link. The method comprises generating aggregate egress data for multiple endpoints by aggregating amounts of egress traffic detected by servers processing the egress traffic at the endpoints. Then the proportions of traffic flows that traverse each path between each pair of endpoints are obtained. Finally, the amount of traffic flow on a shared link is computed based on the aggregate egress data and the obtained proportions.

BRIEF DESCRIPTION

The above and other features of the present disclosure, including its nature and its various advantages, will be more apparent upon consideration of the following detailed description, taken in conjunction with the accompanying drawings in which.

DETAILED DESCRIPTION

To provide an overall understanding of the invention, certain illustrative embodiments will now be described, including a system for indirectly measuring the amount of traffic flow that traverses a link in a network. In particular, the systems and methods described herein may be implemented in systems such as those described in U.S. patent application Ser. No. 13/302,952 (Optimizing Data in a Traffic Network, filed Nov. 22, 2011) and U.S. patent application Ser. No. 13/233,362 (A Modification of Epstein's Algorithm to Find Loopless Paths, filed Sep. 15, 2011), which are both incorporated herein in entirety by reference. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1A:
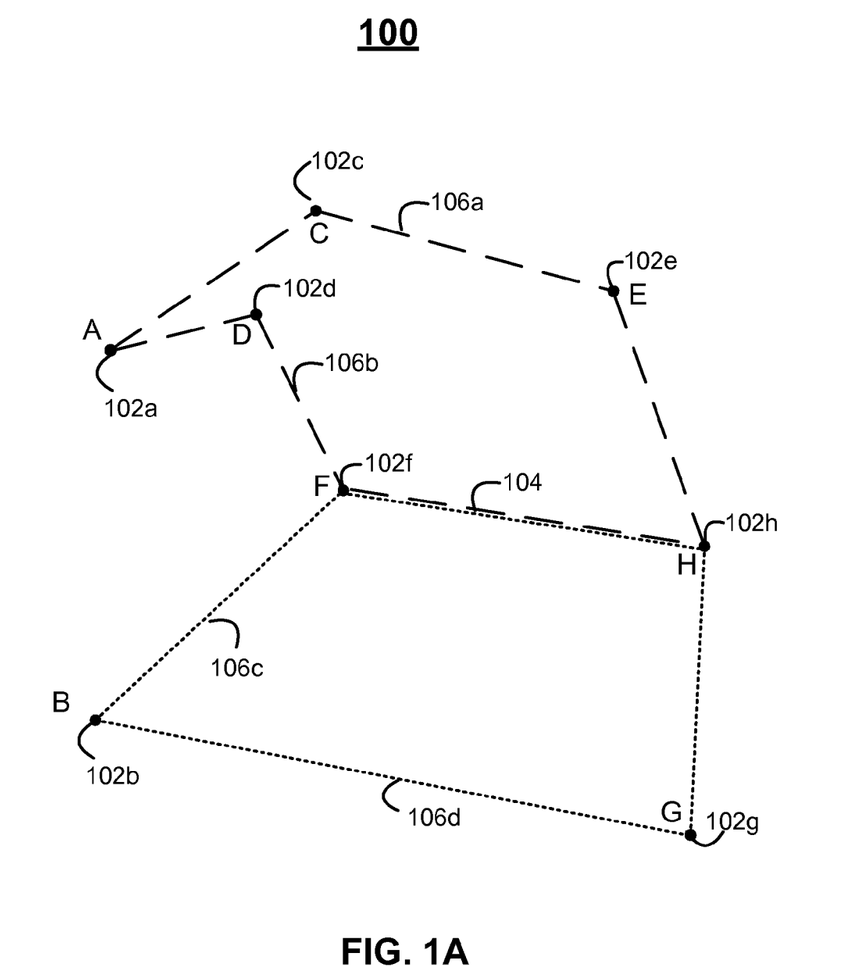
FIGS. 1A and 1B are diagrams of a system for measuring the amount of traffic flow that traverses a link in a network, according to an illustrative embodiment of the invention.

FIG. 1A is a diagram of a network 100 in which data traverses paths between two pairs of endpoints, according to an illustrative embodiment of the invention. Network 100 includes eight nodes 102a-102h (each generally a node 102), four paths 106a-106d (each generally a path 106), and a shared link 104. Two nodes 102 are origin endpoints (102a and 102b), and one node 102 is a destination endpoint (102h). An endpoint pair consists of an origin endpoint and a destination endpoint. The remaining nodes are routers (nodes 102c-102g) or intermediate nodes. That is, they do not serve as origin endpoints or destination endpoints for paths 106a-106d. They may, however, serve as origin or destination endpoints for other paths in the network 100. Path 106a originates from origin endpoint, node 102a, and traverses through nodes 102c and 102e before reaching its destination endpoint, node 102h. Path 106b originates from origin endpoint, node 102a, and traverses through nodes 102d and 102f before reaching its destination endpoint, node 102h. Similarly, paths 106c and 106d originate from origin endpoint, node 102b, traverse through nodes 102f or 102g, respectively, and end at their destination endpoint, node 102h.

Network 100 illustrates a portion of an internet backbone network, which is an infrastructure that interconnects various networks and provides possible paths for transmitting data between two endpoint pairs. In network 100, packets of data flow in the form of traffic along the paths 106 from an origin endpoint, e.g., nodes 102a or 102b (where traffic is egress, or outgoing) to a destination endpoint, e.g., node 102h (where traffic is ingress, or incoming). Each path consists of multiple network links, which are direct connections between two nodes: an origin endpoint and a router, two routers, or a router and a destination endpoint. Links may be formed over fiber optic cable connections, over wireless connections, or using any other transmission mechanism that is capable of transferring data from one node to another node. Paths may also share links. For example, in network 100, link 104 (defined between nodes 102f and 102h) is shared by paths 106b and 106c.

In a content delivery network, certain servers are strategically placed such that the capacity of the network is higher than without the strategically placement of the servers. These servers are typically edge servers, which are caching proxy servers, meaning that they store local copies of content that is otherwise stored in a central location. If a user located far from the central location wishes to access content that is centrally stored but is located near an edge server that stores the same content as a local copy, the user would access the local copy. In this way, edge servers are used to improve bandwidth and latency to users while lessening traffic congestion at the central location.

In addition, depending on how the system is designed, edge servers that receive requests for access to content that is not stored locally may be configured to check the central servers for the original content as well as other edge servers for local copies. For example, a user located near an edge server at node $102h$ wishes to access data that is not stored on the edge server at node $102h$, but is stored on an edge server at node $102a$. In this case, data packets are sent over paths $106a$ or $106b$ from node $102a$ to node $102h$ such that the user may access the desired data.

Each packet of data is marked with the address of its destination. Before the packets reach their destination at node $102h$, the packets need to traverse multiple links connected by routers at intermediate nodes $102c$-$102g$. These routers' functions include reading the destination address of each incoming packet and forwarding the packet to another router or directly to its destination. Thus, network links carry traffic of data packets to their destinations. Each link is associated with a maximum flow capacity, or the maximum amount of data the link can transfer within a unit of time.

When traffic on a link is near or exceeds the flow capacity of the link, delays and loss of data packets can occur. In order to ensure that data packets are not lost and to avoid congestion on a link, it is desirable for a network to have a mechanism in place to ensure that traffic is not congested along the paths between origin endpoints and destination endpoints. One way to do this is to monitor the amount of traffic on a link and adjust the flows as necessary. However, directly measuring traffic across every link would be expensive and would generate excess data to be processed than needed to effectively control link flows. Furthermore, direct measurement does not easily allow the total traffic on a congested link to be decomposed into components of traffic generated by different users and/or applications.

Figure 1B:
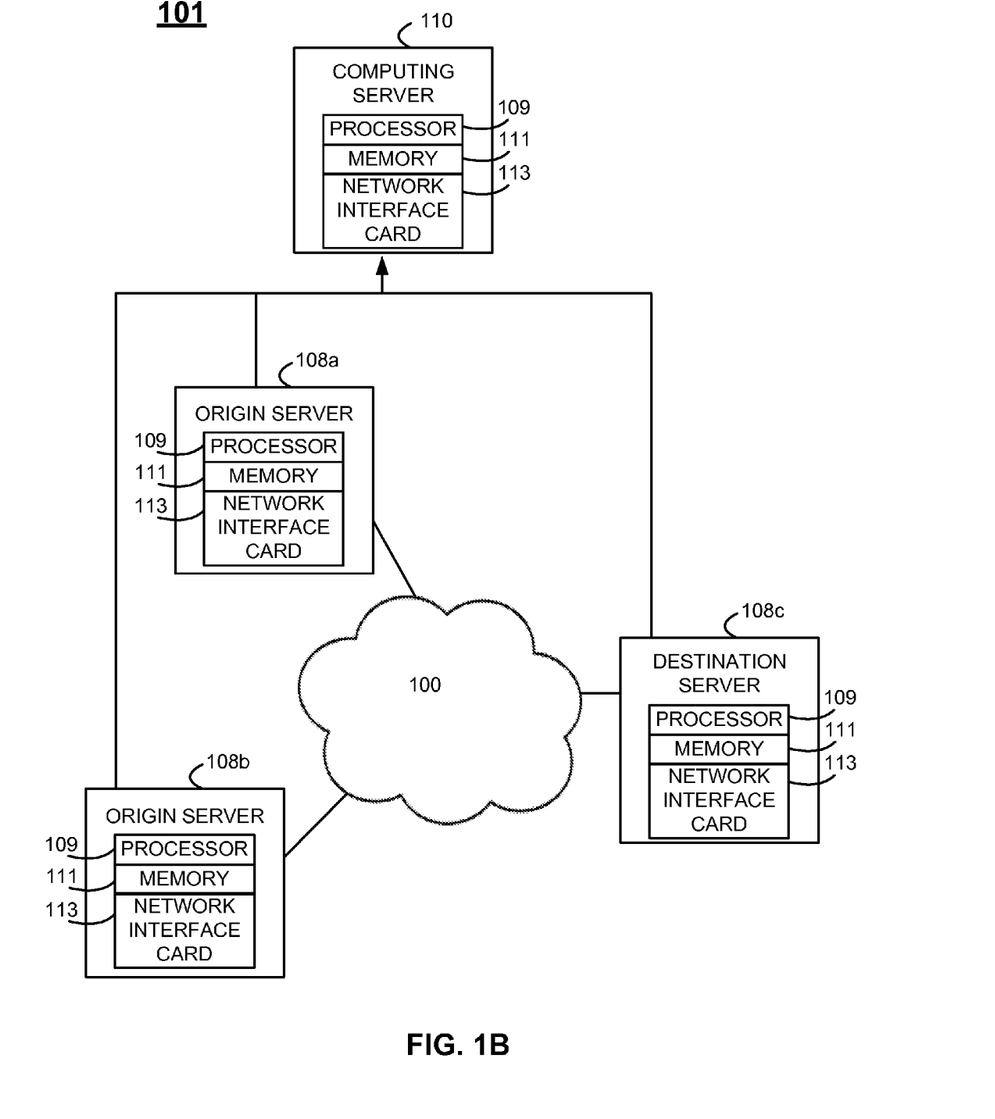

FIG. 1B is a block diagram of a system 101 for measuring the amount of traffic flow that traverses a link in the network 100 of FIG. 1A, according to an illustrative embodiment of the invention. System 101 includes network 100, two origin servers $108a$ and $108b$, a destination server $108c$, and a computing server 110. Origin servers $108a$ and $108b$ monitor egress traffic that originates from origin endpoints, nodes $102a$ and $102b$, respectively, while destination server $108c$ monitors ingress traffic that arrives at destination endpoint, node $102h$. All three origin and destination servers 108 send data indicative of the traffic flows to computing server 110, which aggregates the volume data associated with the traffic for each origin and destination endpoint. Based on the aggregate data, computing server 110 computes the amount of traffic flow on the shared link 104. Each of the components of system 101 is described further below.

The logic corresponding to methods described herein may be implemented in hardware, software, firmware, or a combination thereof. When the logic is implemented in software, the logic may be stored in a computer readable medium, and the program instructions may be executed by one or more processors incorporated into the various computing devices described below.

Origin servers $108a$ and $108b$ are configured to monitor the traffic flows of egress data streams at origin endpoints, nodes $102a$ and $102b$, respectively. Each origin server 108 includes a processor 109, memory 111, and a network interface card 113. When the logic is implemented in software, the logic is stored in the memory 111, and the program instructions are executed by processor 109. The network interface card 113 provides an interface with network 100 such that the origin servers $108a$ and $108b$ can monitor egress traffic at origin endpoints, nodes $102a$ and $102b$, respectively, and communicate with the network. Origin servers $108a$ and $108b$ are further configured to monitor the destinations of the egress traffic as well as the relative proportions of paths that the egress traffic traverse to reach their destinations.

Similarly, destination server $108c$ is configured to monitor the traffic flows of ingress data streams at a destination endpoint, node $102h$. Destination server $108c$ includes a processor 109, memory 111, and a network interface card 113. When the logic is implemented in software, the logic is stored in the memory 111, and the program instructions are executed by processor 109. The network interface card 113 provides an interface with network 100 such that the destination servers $108h$ can monitor ingress traffic at a destination endpoint, node $102h$, and communicate with the network. Destination server $108c$ is further configured to monitor the origins of the ingress traffic as well as the relative proportions of paths that the ingress traffic has traversed to reach its destination at node $102h$.

Origin servers $108a$ and $108b$ and destination server $108c$ operate independently of one another.

Computing server 110 is configured to receive traffic flow data from origin servers $108a$ and $108b$ and destination server $108c$ and to compute the amount of traffic flow on a shared link based on the received data. The received data from origin servers $108a$ and $108b$ includes the amount of egress traffic, the destinations of egress traffic, the paths to be taken by the egress traffic, and the relative proportions of the egress traffic that will traverse the paths. In addition, the received data from destination server $108c$ includes the amount of ingress traffic, the origins of ingress traffic, the paths taken by the ingress traffic, and the relative proportions of the ingress traffic that traversed the paths. From the received data, the computing server 110 computes the amount of traffic flow on a link that is shared by one or more paths by summing the aggregate amount of traffic flow on each path that traverses the link.

In the example shown in FIG. 1A, let $U_{AH}$ denote the total amount of traffic flowing from an origin endpoint, node $102a$, to a destination endpoint, node $102h$, and $U_{BH}$ denote the total amount of traffic flowing from an origin endpoint, node $102b$, to a destination endpoint, node $102h$. Furthermore, the fractions of $U_{AH}$ and $U_{BH}$ traffic that traverse each path are known. For example, $$\frac{2}{3} * U_{AH}$$

is the amount of traffic flow that traverses path $106a$, $$\frac{1}{3} * U_{AH}$$

traverses path 106b, $$\frac{3}{4} * U_{BH}$$

traverses path 106c, and $$\frac{1}{4} * U_{BH}$$

traverses path 106d. In system 100, link 104 is shared by paths 106b and 106c and not by paths 106a nor 106d. Therefore, assuming no other paths traverse link 104, the total amount of traffic on link 104 is the aggregate sum of the traffic on each path that includes link 104, or $$\frac{1}{3} * U_{AH} + \frac{3}{4} * U_{BH}.$$

In this example, the two paths 106b and 106c that share link 104 also share a common destination endpoint, node 102h. In general, this does not need to be true. Paths that share one or more links may share origin endpoints, destination endpoints, both, or neither.

In general, computing server 110 uses the following equation to determine the amount of traffic flow on a link:

$$V_l = \sum_e \sum_p f_{ep} U_e \qquad (1)$$

where $V_l$ corresponds to the amount of traffic flow on the link l, $U_e$ corresponds to the total amount of traffic flow between an endpoint pair e (consisting of an origin endpoint and a destination endpoint), and $f_{ep}$ corresponds to the proportion of traffic flow that traverses the path p in the plurality of paths between the endpoint pair e that crosses the link l. That is, computing server 110 computes the total amount of traffic flow on a link to be the sum of the amount of traffic flow of each path that shares the link. The first summation in the equation corresponds to summing over all endpoint pairs, and while the second summation corresponds to summing over all paths of an endpoint pair that share the link l. Because $f_{ep}$ corresponds to the fraction of traffic flow on a path p for a given endpoint pair e that crosses the link l, $\Sigma_p f_{ep}=1$.

Network 100 contains two origin endpoints, nodes 102a and 102b, one destination endpoint, node 102h, and four paths connecting the origin endpoints to the destination endpoint. However, it is to be understood by one of ordinary skill in the art, based on the disclosure and teachings herein, that links may be bi-directional, meaning that traffic may flow in either direction such that an endpoint may be both an origin endpoint and a destination endpoint for different data streams. Furthermore, nodes 102c-102g may also be origin and/or destination endpoints for other paths that are not shown in FIG. 1A.

In some embodiments, a single node is an origin endpoint for one set of paths and is also a destination endpoint for another set of paths. In this case, a single server 108 may serve as both origin and destination server for the node. Alternatively, the node may have both an origin server and a destination server.

In some embodiments, servers 108 send the traffic flow data directly to computing server 110, and computing server 110 aggregates the data and performs the computation of the amount of traffic flow on a shared link. In other embodiments, servers 108 perform the aggregation themselves and send the aggregate traffic flow data to computing server 110. In this case, computing server 110 receives aggregated data and performs the computation of the amount of traffic flow on a shared link. In some embodiments, servers 108 send the traffic flow data to one or more intermediate devices, which then forward the data to computing server 110. In this case, the intermediate device may perform the aggregation of data.

In some embodiments, the traffic flow on a link is aggregated according to user or computing application. For example, some applications may be ranked according to priority, and high priority applications are those with high quality of service requirements. In order to function properly, some applications are inelastic, meaning they require a minimum bandwidth or a maximum latency. Examples of such applications include video or audio streaming, videoconferencing, or Voice over IP. In contrast, elastic applications, such as file transfer applications, use however much or little bandwidth is available. Inelastic applications may be assigned higher priority than elastic applications.

In addition, users may also be ranked according to priority. For example, some users pay an extra fee to get higher quality of service compared to other users. This fee may be in the form of a subscription with an internet service provider or another financial relationship between a user and an internet service provider. Ranking users or applications by priority is beneficial when aggregating the traffic flow so that computing server 110 may determine the possibility of rerouting an amount of traffic flow for a low-priority user or application before considering rerouting traffic flow for users or applications with higher priority. In an end-to-end neutral network (a network that abides by the principle of network neutrality), the tiers of priority for certain users are limited, such that internet service providers or governments are not allowed to restrict users' access to the Internet.

Furthermore, endpoint pairs (corresponding to an origin endpoint and a destination endpoint) may also be ranked according to priority. For example, the endpoint pair corresponding to nodes 102a and 102h may be given a higher priority than the endpoint pair corresponding to nodes 102b and 102h. In this case, paths 106a and 106b have higher priority than paths 106c and 106d. Similar to rerouting schemes when applications or users are ranked according to priority, traffic between a low-priority endpoint pair may be rerouted before rerouting traffic between an endpoint pair with higher priority.

Figure 2:
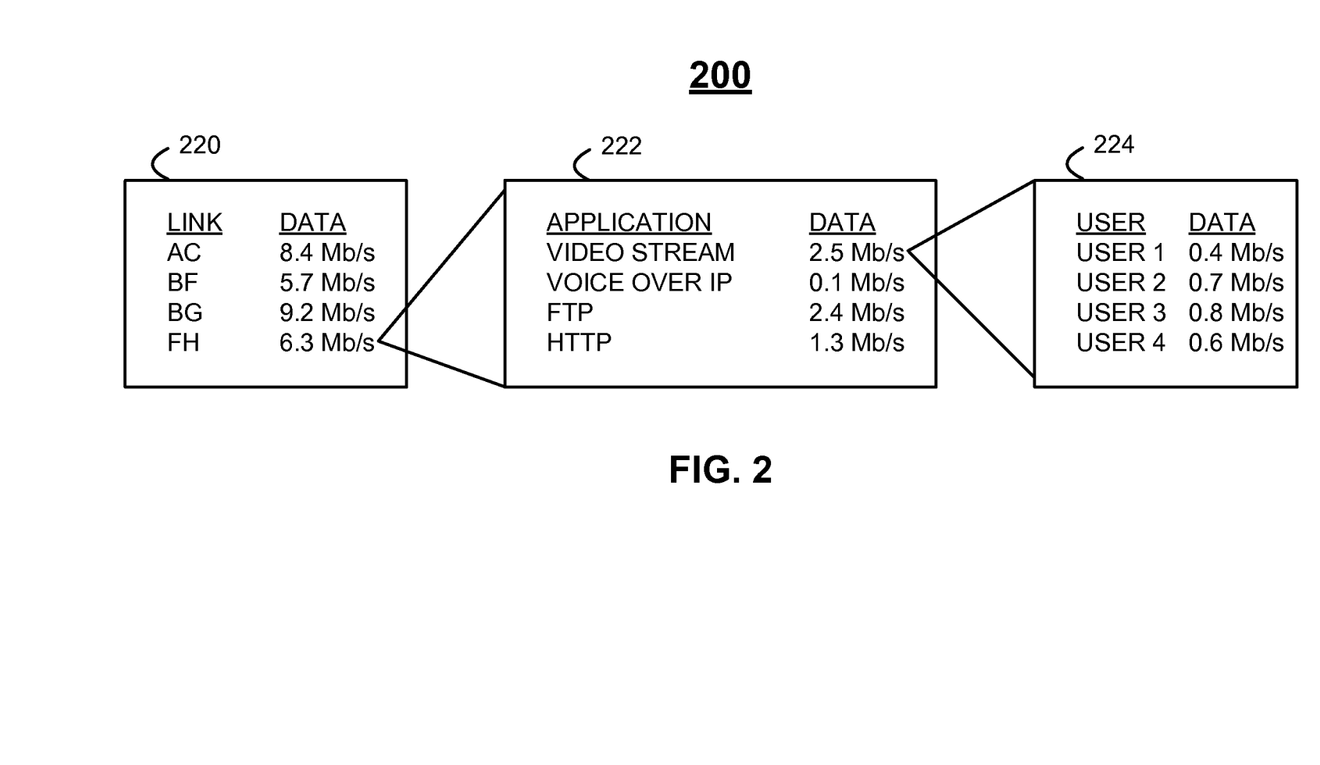
FIG. 2 is a simulated screenshot 200 of a user interface that displays the amount of traffic on a link, according to an illustrative embodiment of the invention.

FIG. 2 is a simulated screenshot 200 of a user interface that displays the amount of traffic on a link, according to an illustrative embodiment of the invention. Display 200 includes a table 220 that lists the traffic flow in Mbits/second (Mb/s) by link, a table 222 that lists the traffic flow by application for a link, and a table 224 that lists traffic flow by user for an application over a link.

First, table 220 displays a high level list of the aggregate data that traverses a link defined by an endpoint pair as shown in FIG. 1A. The left column of table 220 indicates the endpoint pair that defines the link. For example, 6.3 Mb/s of traffic traverses the link defined by FH, or from node 102f to node 102h.

If a user is interested in the details of the applications that are using the traffic on a certain link, the user selects the row of table 220 that corresponds to the link of interest, and the user interface displays table 222. Table 222 displays the different flow rates of traffic that traverses link FH for different applications. For example, streaming video data uses 2.5 Mb/s, and Voice over IP uses 0.1 Mb/s. Computing server 110 aggregates ingress and/or egress data separately for different applications. One reason for separate aggregation by application is to prioritize certain applications differently than others. For example, as described in relation to FIG. 1B, video streaming and Voice over IP require continuous un-interrupted data streams with minimal latency. In contrast, file transfer applications may make use of however much bandwidth is available, and web browsing applications are bursty, meaning the data rate is volatile with time, and the ratio of peak to average data rate is high. Because different applications have different requirements, it is beneficial to aggregate traffic flows separately in order to ensure that the needs of different applications are met.

If a user is interested in the details of the users that are using the traffic on a link for a specific application, the user selects the row of table 222 that corresponds to the application of interest, and table 224 is displayed. Table 224 displays the different flow rates of traffic that traverses link FH for different users for an application. As shown in table 224, four users are streaming video on link FH. Similar to applications, users may also be ranked by priority. For example, some users may pay an extra fee in order to get higher priority over other users.

In some embodiments, the tables 220, 222, and 224 display average data transfer rates over a certain time interval, such as 1, 2, or 5 seconds. For example, if a 5 second interval is used, the amount of traffic that has traversed link FH in the last 5 seconds is 6.3*5=31.5 Mb. Furthermore, the tables in display 200 may be refreshed periodically, for example every 1, 2, or 5 seconds. In other embodiments, rather than displaying the average data transfer rates (in Mb/s), tables 220, 222, and 224 display the total amounts of data transferred across the link (in Mb).

In some embodiments, the links are bidirectional, so two results may be shown for links FH (data sent from node 102*f* to node 102*h*) and HF (data sent from node 102*h* to node 102*f*).

In some embodiments, the display 200 of the user interface is supported by a database that stores the aggregate link data by application and user. For example, computing server 110 stores the data shown in the user interface of display 200 in a data structure that is stored in the memory 111 of the computing server 110.

In some embodiments, computing server 110 displays this information on a monitor, while in other embodiments, computing server 110 sends the data to an external device that displays the tables.

Display 200 shows an example of what information the computing server 110 displays in a graphical user interface once the amount of traffic on a link has been computed. It is to be understood by one of ordinary skill in the art, based on the disclosure and teachings herein, that various other tables that display information indicative of the type of traffic flow that traverse a link may also be displayed.

Figure 3:
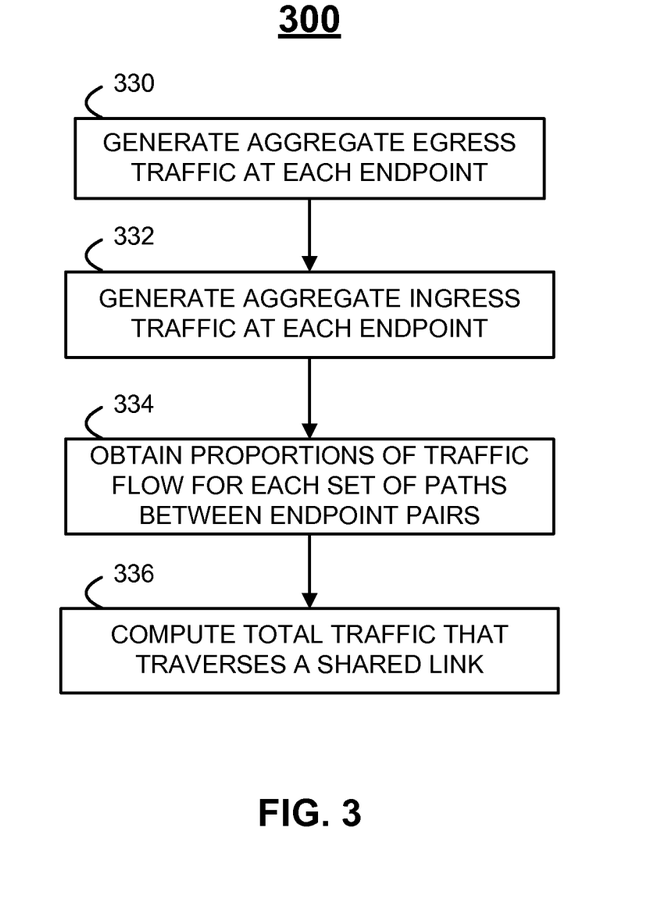
FIG. 3 is a flowchart of a method for measuring the amount of traffic flow that traverses a link in a network, according to an illustrative embodiment of the invention.

FIG. 3 shows a flowchart of a method 300 for measuring the amount of traffic flow that traverses a link in a network, according to an illustrative embodiment of the invention. The method 300 includes the steps of generating aggregate egress traffic at each endpoint (step 330), generating aggregate ingress traffic at each endpoint (step 332), obtaining proportions of traffic flow for each set of paths between endpoint pairs (step 334), and computing the total amount of traffic that traverses a link (step 336).

First, computing server 110 generates aggregate egress traffic at each origin endpoint (step 330). Origin servers 108*a* and 108*b* send the outgoing data streams to the computing server 110, which performs the aggregation by summing the amount of outgoing data over a time interval.

Then, computing server 110 generates aggregate ingress traffic at each destination endpoint (step 332). Destination server 108*c* sends the incoming data streams to the computing server 110, which performs the aggregation by summing the amount of incoming data over a time interval.

In addition, for each endpoint pair (consisting of an origin endpoint and a destination endpoint) computing server 110 obtains the proportions of traffic that traverses each path from the origin endpoint to the destination endpoint (step 334). For a given origin-destination endpoint pair, the proportions sum to one. Origin servers 108*a* and 108*b* monitor the destinations of the various egress data streams as well as these proportions, and destination servers 108*c* monitor the origins of the various ingress data streams as well as these proportions. In network 100, all of the egress traffic leaving origin endpoint, node 102*a*, has a destination at destination endpoint, node 102*h*, but in general egress traffic leaving an origin endpoint may have multiple destination endpoints.

Finally, computing server 110 computes the total amount of traffic that traverses a link (step 336) by summing all the traffic that traverses each path that contains the link. Computing server 110 uses Equation 1 to perform this computation, summing the product of the aggregate traffic multiplied by the relative proportion of traffic flow across the set of paths for all endpoint pairs.

In some embodiments, computing server 110 performs this computation separately for different users or applications, or for different types of users or applications. For example, some users or applications have different levels of priority, and method 300 may be performed separately for different priority levels.

Steps 330, 332, and 334 may be performed in any order (or two or all of the steps may be performed simultaneously) and are shown sequentially in method 300 for illustrative purposes only.

In some embodiments, the system is self-contained, meaning that for each origin server (corresponding to an origin endpoint) that sends data to the computing server 110, the computing server 110 also receives data from all destination servers that correspond to the destinations of the data packets leaving the origin endpoint. Similarly, for each destination server (corresponding to a destination endpoint) that sends data to the computing server 110, in a self-contained system, the computing server 110 also receives data from all origin servers that correspond to the origins of the data packets arriving at the destination endpoint. In other words, a self-contained system includes all possible origin and destination endpoint pairs, and the computing server 110 receives data regarding each endpoint pair. In this case, the data monitored by origin servers and destination servers is redundant, thus requiring only one of steps 330 and 332 to be performed. However, sometimes inaccuracies in the estimates are intolerable such that in order to test the data reliability, steps 330 and 332 are both performed.

In other embodiments, the system is not self-contained, meaning that the computing server 110 only receives data regarding a subset of a self-contained network. For example, an origin server monitoring egress traffic at an origin endpoint sends data to the computing server 110. The origin endpoint may have two data streams with different destination endpoints. The first destination endpoint's ingress traffic is monitored by a destination server that sends data to the computing server 110. The other destination endpoint's traffic is either not monitored by a destination server, or its destination server does not send data to the computing server 110. For example, two separate entities may monitor the ingress traffic at the two destination endpoints, but are not willing to share this information with each other. In this case, the data monitored by origin servers and destination server is not redundant, requiring both steps 330 and 332 to be performed in order to more accurately perform the computation in step 336.

Figure 4:
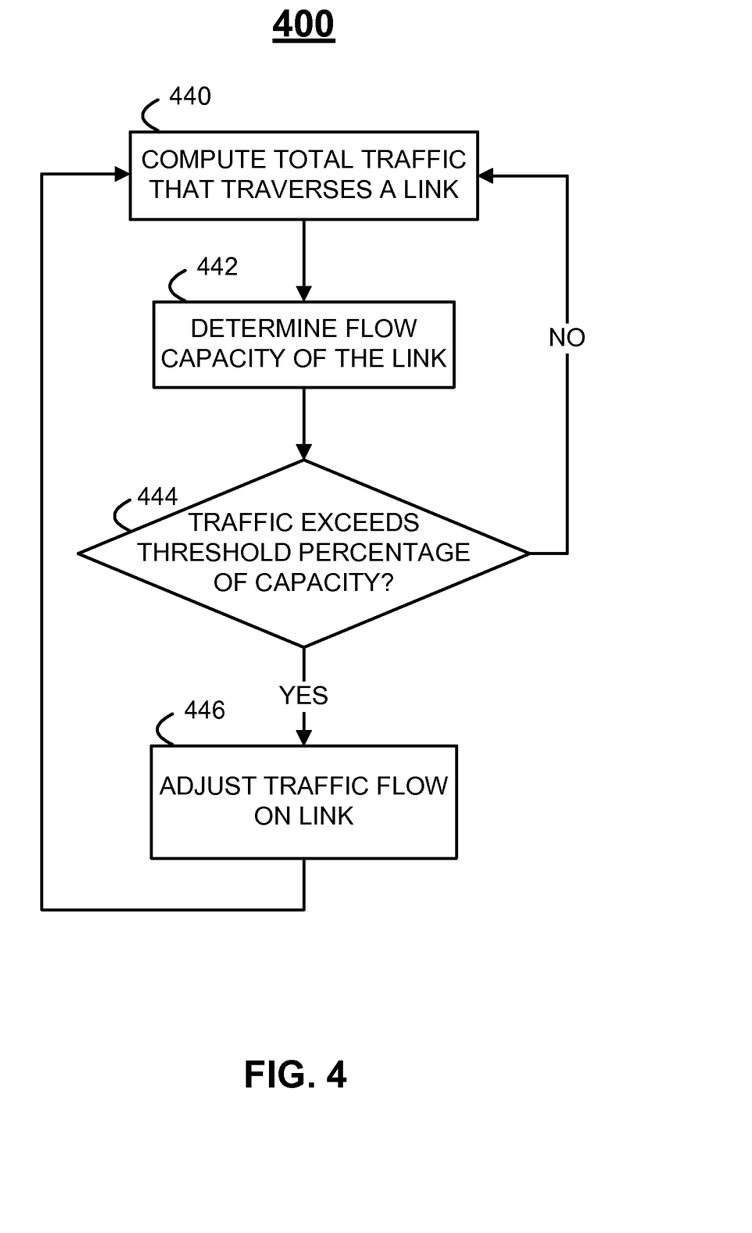
FIG. 4 is a flowchart of a method for adjusting the traffic on the paths crossing a link if the measured amount of traffic flow exceeds a threshold, according to an illustrative embodiment of the invention.

FIG. 4 is a flowchart of a method 400 for adjusting the traffic on the paths crossing a link if the measured amount of traffic flow exceeds a threshold, according to an illustrative embodiment of the invention. Method 400 includes the steps of computing the total amount of traffic that traverses a link (step 440), determining the flow capacity of the link (step 442), and when determining that the computed traffic exceeds a threshold percentage of the flow capacity (decision 444), adjusting the traffic on the paths crossing the link (step 446).

First, the total amount of traffic that traverses a link is computed (step 440). Computing server 110 follows the method of 300 or a similar method as described in relation to FIG. 3 to perform this computation. Then, the computing server 110 determines the flow capacity of the link (step 442). The link capacity is the maximum amount of traffic that may traverse a link and is measured in bandwidth, or Mb/s. Link capacity may be defined in several different ways, including maximum theoretical throughput, maximum achievable throughput, peak measured throughput, or maximum sustained throughput. In some embodiments, the flow capacity of the link is determined by a server 108 or by an intermediate device and then sent to the computing server 110.

At step 444, the computing server 110 determines whether the computed traffic in step 440 exceeds a threshold percentage of the link capacity determined in step 442. The threshold percentage may be the same value for different links, or a different threshold percentage may be used for different links.

If the computing server 110 determines that the computed traffic exceeds a threshold percentage of the link capacity, the computing server 110 adjusts the amount of traffic on the paths crossing the link (step 446). For example, the threshold percentage may be 80%, such that if the computed amount of traffic exceeds 80% of the link's capacity, the computing server 110 adjusts the amount of traffic on the paths crossing the link. One way the computing server 110 adjusts the amount of traffic on the paths crossing the link is by reducing egress traffic from at least one origin endpoint that has a path crossing the link. In a second implementation, the computing server 110 modifies at least one of the paths that crosses the link to an alternate path that does not cross the link, thereby shifting the relative proportion of traffic that flows over at least one path that traverses the link to an alternate path and decreasing the amount of traffic on the paths crossing the link.

In some embodiments, traffic is ranked by priority. For example, some applications or users may have higher priority than other applications or users. As another example, certain origin-destination endpoint pairs may have higher priority than other endpoint pairs. In this case, the proportion of low-priority traffic that traverses the path is shifted to an alternate path before shifting the relative proportions of traffic with higher priority.

Once traffic flow has been adjusted on a link, or if the computing server 110 determines that the computed traffic does not exceed a threshold percentage of the link capacity (decision 444), the computing server 110 returns to step 440 to update the computation of the total traffic that traverses the link. In some embodiments, computing server 110 performs the computation of the total traffic on multiple links simultaneously, such that at any given time, computing server 110 could be in different stages of method 400 for different links.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method for measuring traffic flow on a first link, comprising:
   generating, by a processor, aggregate egress data for each of a plurality of endpoints by aggregating amounts of egress traffic detected by servers processing the egress traffic at the respective endpoints;
   obtaining, by the processor, for a plurality of pairs of endpoints from the plurality of endpoints, proportions of traffic flows that traverse each of a plurality of paths between respective pairs of endpoints, wherein each of the plurality of paths includes a corresponding plurality of network links, and at least one path between a first of the endpoint pairs and at least one path between a second of the endpoint pairs both include the first link; and
   computing, by the processor, an amount of traffic flow on the first link based on the aggregate egress data and the obtained proportions.

2. The method of claim 1, wherein the computation of an amount of traffic flow on the first link in the plurality of links uses the equation, $$V_l = \sum_e \sum_p f_{ep} U_e$$

wherein
   $V_l$ corresponds to the amount of traffic flow on the first link l;
   $U_e$ corresponds to the total amount of traffic flow between an endpoint pair e; and
   $f_{ep}$ corresponds to the proportion of traffic flow that traverses the path p in the plurality of paths between the endpoint pair e that crosses the link l.

3. The method of claim 1, wherein an endpoint pair comprises an origin endpoint and a destination endpoint, wherein traffic flows from the origin endpoint to the destination endpoint.

4. The method of claim 1, further comprising monitoring, by the servers, the egress traffic at at least one endpoint.

5. The method of claim 1, wherein generating aggregate egress data comprises separately aggregating amounts of egress data associated with a plurality of users or a plurality of computing applications.

6. The method of claim 1, further comprising:
   determining, by the processor, the flow capacity on the first link; and
   in response to the processor determining that the computed traffic flow on the first link exceeds a threshold percentage of the flow capacity on the first link, adjusting, by the processor, the proportion of traffic flow on a path comprising the first link thereby adjusting the traffic flow on the first link.

7. The method of claim 1, further comprising:
determining, by the processor, the flow capacity on the first link; and based on the computed traffic flow on the first link and the flow capacity on the first link,
decreasing, by the processor, the flow over the first link for a user or computing application with a first level of priority, and
increasing, by the processor, the flow over the first link for a user or computing application with a second level of priority greater than the first level of priority.

8. The method of claim 1, further comprising generating, by the processor, aggregate ingress data for each of the plurality of endpoints by aggregating amounts of ingress traffic detected by servers processing the ingress traffic at the respective endpoints.

9. A system for measuring traffic flow on a first link, comprising a processor configured to:
generate aggregate egress data for each of a plurality of endpoints by aggregating amounts of egress traffic detected by servers processing the egress traffic at the respective endpoints;
obtain, for a plurality of pairs of endpoints from the plurality of endpoints, proportions of traffic flows that traverse each of a plurality of paths between respective pairs of endpoints, wherein each of the plurality of paths includes a corresponding plurality of network links, and at least one path between a first of the endpoint pairs and at least one path between a second of the endpoint pairs both include the first link; and
compute an amount of traffic flow on the first link based on the aggregate egress data and the obtained proportions.

10. The system of claim 9, wherein the processor computes an amount of traffic flow on the first link by using the equation, $$V_l = \sum_e \sum_p f_{ep} U_e$$

wherein
$V_l$ corresponds to the amount of traffic flow on the first link l;
$U_e$ corresponds to the total amount of traffic flow between an endpoint pair e; and
$f_{ep}$ corresponds to the proportion of traffic flow that traverses the path p in the plurality of paths between the endpoint pair e that crosses the link l.

11. The system of claim 9, wherein an endpoint pair comprises an origin endpoint and a destination endpoint, wherein traffic flows from the origin endpoint to the destination endpoint.

12. The system of claim 9, further comprising a server that monitors the egress traffic at at least one endpoint.

13. The system of claim 9, wherein the processor generates aggregate egress data by separately aggregating amounts of egress data associated with a plurality of users or a plurality of computing applications.

14. The system of claim 9, wherein the processor is further configured to:
determine the flow capacity on the first link; and
if the computed traffic flow on the first link exceeds a threshold percentage of the flow capacity on the first link, adjust the proportion of traffic flow on a path comprising the first link thereby adjusting the traffic flow on the first link.

15. The system of claim 9, wherein the processor is further configured to:
determine the flow capacity on the first link; and based on the computed traffic flow on the first link and the flow capacity on the first link,
decrease the flow over the first link for a user or computing application with a first level of priority, and
increase the flow over the first link for a user or computing application with a second level of priority greater than the first level of priority.

16. The system of claim 9, wherein the processor is further configured to generate aggregate ingress data for each of the plurality of endpoints by aggregating amounts of ingress traffic detected by servers processing the ingress traffic at the respective endpoints.

17. A method for measuring traffic flow on a first link, comprising:
generating, by a processor, aggregate ingress data for each of the plurality of endpoints by aggregating amounts of ingress traffic detected by servers processing the ingress traffic at the respective endpoints;
obtaining, by the processor, for a plurality of pairs of endpoints from the plurality of endpoints, proportions of traffic flows that traverse each of a plurality of paths between respective pairs of endpoints, wherein each of the plurality of paths includes a corresponding plurality of network links, and at least one path between a first of the endpoint pairs and at least one path between a second of the endpoint pairs both include the first link; and
computing, by the processor, an amount of traffic flow on the first link based on the aggregate ingress data and the obtained proportions.

18. A system for measuring traffic flow on a first link, comprising a processor configured to:
generate aggregate ingress data for each of the plurality of endpoints by aggregating amounts of ingress traffic detected by servers processing the ingress traffic at the respective endpoints;
obtain, for a plurality of pairs of endpoints from the plurality of endpoints, proportions of traffic flows that traverse each of a plurality of paths between respective pairs of endpoints, wherein each of the plurality of paths includes a corresponding plurality of network links, and at least one path between a first of the endpoint pairs and at least one path between a second of the endpoint pairs both include the first link; and
compute an amount of traffic flow on the first link based on the aggregate ingress data and the obtained proportions.

* * * * *